CLEANING APPARATUS WITH RELIEF CONTROL VALVE

Original Filed Nov. 28, 1962

INVENTORS
IVEN R. NORSTRUD
JOHN H. THRELKELD
BY
Schroeder & Siegfried
ATTORNEYS

United States Patent Office

Re. 27,855
Reissued Dec. 25, 1973

27,855
CLEANING APPARATUS WITH RELIEF CONTROL VALVE

Iven R. Norstrud and John H. Threlkeld, Britt, Iowa, assignors to Britt Tech Corporation, Britt, Iowa Original No. 3,140,049, dated July 7, 1964, Ser. No. 240,629, Nov. 28, 1962. Application for reissue July 1, 1966, Ser. No. 572,164
Int. Cl. B05b *7/04, 9/00*
U.S. Cl. 239—126 18 Claims

Matter enclosed in heavy brackets [ ] appears in the original patent but forms no part of this reissue specification; matter printed in italics indicates the additions made by reissue.

*ABSTRACT OF THE DISCLOSURE*

*The present disclosure is directed to pressure washing apparatus used primarily in washing vehicles. The pressure washer uses a high-pressure pump to deliver a cleaning solution to the surface to be cleaned at approximately 500 p.s.i. through a flow-directing device or gun. The choice of at least two cleaning fluids is controlled through the use of a solenoid operated valve and a check valve. The solenoid-operated valve is controlled by the changes in fluid-line pressure between the pump and the gun due to opening and closing the valve in the gun. A pressure relief valve including a pressure-actuated switching mechanism is connected to the fluid line between the pump and the gun and responds to the pressure changes in the line. An electrical circuit including the switching mechanism and solenoid-operated valve alternately opens and closes the solenoid-operated valve to change the source of cleaning solution. The switching mechanism is controlled by the pressure changes in the line created by opening and closing the valve in the flow-directing device or gun.*

Figure 1:
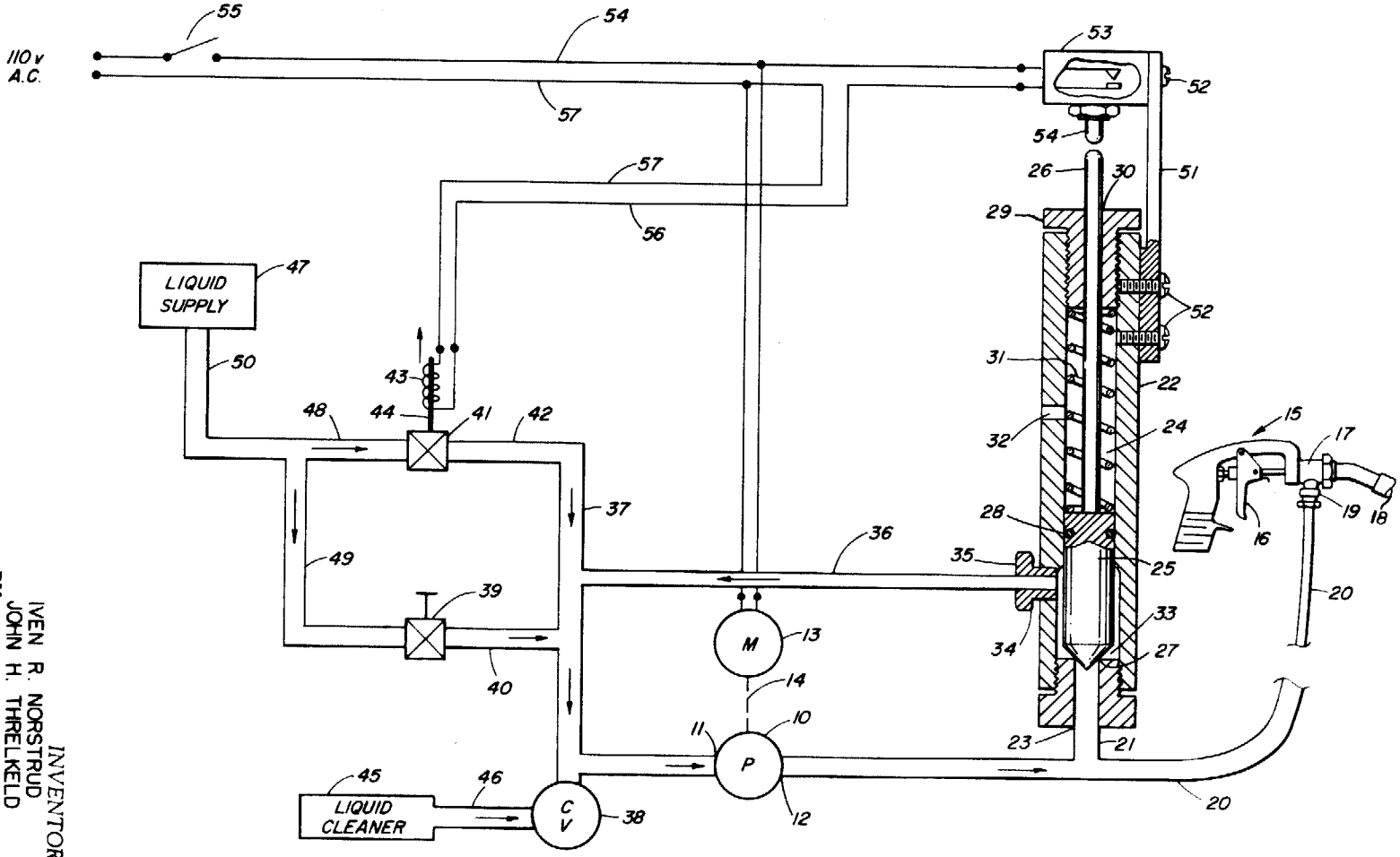

This invention relates to the field of cleaning apparatus and more particularly to the field of cleaning apparatus used in the automotive and machinery field for cleaning lubricants, dirt and grime and other foreign matter from the engines and related apparatus associated therewith.

The more conventional manner of cleaning automotive engines and other machinery which become grimy and dirty through the collection of dirt and dust mixed with oils, has been to use pressurized steam for loosening the materials from the devices to be cleaned. Generally, such equipment is rather expensive requiring some form of steam generators and since the pressure generated is generally relatively high, there is also some danger of foreign matter becoming dislodged and striking the operator or becoming lodged in some operating piece of the machinery. Also, some forms of cleaning equipment require the addition of said under pressure to aid in the cleaning process. On the other hand, our cleaning apparatus is designed to overcome these and other disadvantages of such cleaning equipment as are generally known in the trade.

It is therefore a general object of the present invention to provide novel and improved cleaning apparatus.

It is yet another object of the present invention to provide novel and improved cleaning apparatus using a relief valve for controlling the pressure in the apparatus.

It is still another object of this invention to provide cleaning apparatus having a relief valve and remote control means for selecting one of a plurality of liquids to be dispensed.

It is still another object of the present invention to provide cleaning apparatus using a control actuated by a relief valve to provide a plurality of different liquids for use by a discharge device.

It is another object of the present invention to provide cleaning apparatus having sequential control means for supplying different liquids from the discharge apparatus in a sequential manner.

It is still a further object of this invention to provide cleaning apparatus having means operated sequentially by changes in pressure in the discharge apparatus.

It is still another object of this invention to provide cleaning apparatus using solenoid operated valves in the fluid passages for controlling the flow of the liquids to be sequentially discharged.

These and other objects and advantages of our invention will more fully appear from the following description, made in connection with the accompanying drawings, wherein like reference characters refer to the same or similar parts throughout the several views, and in which:

FIG. 1 is a liquid and electrical schematic of the cleaning apparatus with that portion associated with the discharge apparatus being shown in reduced form.

A pump 10 as a liquid inlet 11 and a liquid outlet 12 which is mechanically connected to a motor 13 through a shaft 14. A flow directing device or gun 15 has a trigger 16 which is used to operate a valve 17 so that fluid may be discharged through a nozzle 18. Flow directing apparatus 15 may be of any type generally employing a valve arrangement for opening and shutting off the flow of liquid which is generally discharged through a nozzle which may be flexible or rigid depending upon the requirements. This particular device is not limited to any particular type or the product of any given manufacturer as long as it performs the functions just set forth. Situated in fluid communication with valve 17 is an orifice 19, to which is connected a flexible conduit 20 which is shown in broken form, it being understood that the flow directing means 15 is drawn to a smaller scale than the other portion of the schematic. Conduit 20 is connected to outlet 12 of pump 10 so that liquid may be pumped to flow directing means 15 through conduit 20. Situated between orifice 19 and pump outlet 12, is a branch line 21 which is connected to a relief valve 22 through an inlet 23 formed therein. Relief valve 22 has an inner chamber 24 formed therein in which a piston 25 carrying an elongated rod member 26 moves longitudinally within chamber 24 in a manner to be more fully described later. Inlet 23 to relief valve 22 defines a valve seat 27 in which the conical shaped end of piston 25 normally is disposed when valve 17 of flow directing means 15 is open. Piston 25 has an O ring 28 circumferentially described about piston 25 in a mating annular groove. Supporting the upper end of rod element 26 is a plug 29 which may be threadedly inserted into the upper end of chamber 24 and has a bore 30 formed therein to guide rod element 26 in a vertical direction. To insure that piston 25 is seated against valve seat 27, a biasing spring 31 is situated in chamber 24 under compression between plug 29 and the cooperating end of piston 25 thereby maintaining a force downwardly upon piston 25. Situated in communication with chamber 24, is a vent 32 which acts to release the pressure developed upon the movement of piston 25 upwardly within chamber 24. Once piston 25 moves upwardly in chamber 24, liquid will have a larger area upon which to exert its force and will therefore maintain piston 25 in a non-communicating relationship with valve seat 27 at a reduced pressure. The liquid then flows into a cylinder 33 which is in communication with an outlet 34 of relief valve 22. Situated in outlet 34 is a second orifice 35 which is threadedly connected into outlet 34; orifice 35 having a larger cross-sectional area than orifice 19 which is in communication with valve 17 of flow directing means 15.

A conduit 36 is connected between orifice 35 and another conduit 37 which is in communication with a check valve 38 and the inlet 11 to pump 10. In other words, there is a fluid or liquid passage from orifice 35 through conduit 36 to pump 10 and from pump 10 through conduit 20 and branch 21 to the inlet 23 of relief valve 22 and upon piston 25 being actuated, fluid is allowed to circulate back through conduit 36. This then forms a relief bypass to maintain the pressures within the different conduit at predetermined pressures. Conduit 37 is in communication with an adjustable valve 39 through a conduit 40. A solenoid operated valve 41 is also in communication with conduit 37 through a conduit 42. Solenoid operated valve 41 contains a solenoid coil 43 and armature 44, it being understood that armature 44 is connected to the element within the valve thereby allowing the liquid to flow therethrough in one position and shut off the flow of the liquid in the other position. Check valve 38 is connected to a source of liquid cleaner 45 through a conduit 46. It will, of course, be understood that check valve 38 allows the fluid to flow in one direction only, in this instance, in the direction towards pump inlet 11 so that the pressure in conduit 37, after reaching a predetermined magnitude, closes check valve 38 to stop the reverse flow of liquid into the source of liquid cleaner 45.

A liquid supply source 47 is connected to valves 41 and 39 through a pair of conduits 48 and 49 respectively having their other ends defining a common duct 50 which is connected to the liquid supply source 47. In other words, liquid supply source 47 is connected to valves 41 and 39 through parallel branches of a conduit. Valve 39 is provided with an adjustment for controlling the flow of the liquid supply source 47 through conduit 40 and therefore the flow may be regulated for the desired optimum operating characteristics.

A bracket 51 is secured to the upper portion of relief valve 22 by a pair of screws or other suitable fastening means 52. Bracket 51 extends upwardly above operating rod 26 and has secured thereto, a switch 53 by suitable means such as screws 52. Switch 53 is of the snap acting type wherein a plunger 54 alternately causes the switch contacts to be in communication with each other upon depressing plunger 54 a first time and upon depressing plunger 54 a second time, the contacts are disengaged. Also, switch 53 may be of some form of stepping switch in which each actuation of plunger 54 causes the switch to step to the next set of contacts and sequentially return to its initial or starting position. Switch 53 may be of any form as long as the sequential function is maintained between distinct contacts and the moving switch arm. For the particular embodiment shown, only a pair of contacts are being used and this is shown schematically by the broken away view of switch 53. One terminal of switch 53 is connected to a source of alternating current through a conductor 54 and a single pole single throw switch 55. Switch 55 is shown in the open position and would generally be known as the power switch. The other terminal of switch 53 is connected to one terminal of solenoid coil 43 through a conductor 56 and the other terminal of coil 43 is connected to the alternating current source through a conductor 57. Motor 13 is connected to conductors 57 and 54 respectively so that motor 13 has power applied thereto whenever switch 55 is closed.

Operation

To start the cleaning apparatus, switch 55 is closed and electrical power is applied to motor 13 and to coil 43 of solenoid operated valve 41 if switch 53 has its contacts in electrical engagement. For the purposes of illustration, it can be assumed that switch 53 has its contacts disengaged and, therefore, coil 43 is deenergized and valve 41 is therefore closed. In this condition, pump 12 has its inlet 11 in communication with liquid supply source 47 through valve 39 only and it should be remembered that valve 39 is adjustable and will be set to a given condition as will be explained. Since valve 39 has its opening somewhat restricted to restrict the flow of liquid therethrough, pump 10 produces a reduced pressure in conduit 46 and therefore liquid cleaner is drawn from source 45 through check valve 38 into pump 10. Pump 10 forces the liquid under pressure to flow directing means 15 or the gun as shown. With trigger 16 in a deenergized position, valve 17 remains closed and the pressure is allowed to build up in conduit 20. Upon the pressure building up in conduit 20 and branch 21 which is in communication therewith, piston 25 of relief valve 22 will be forced upwardly when the critical pressure imposed upon the end of piston 25 overcomes the spring tension of bias spring 31 and causes piston 25 to move upwardly, thereby causing operating rod 26 to move upwardly or vertically. Since the O ring 28 forms a seal against the edge of chamber 24, the liquid is then forced through conduits 36 and 37 back to the inlet of pump 10. Generally, the liquid supply source 47 is under pressure and therefore the fluid circulated by the pump does not flow in reverse fashion through valve 39. During the period when the pressure is increasing in conduit 20 and after piston 25 has moved vertically, the fluid is prevented from passing into the liquid cleaner source 45 by check valve 38 which closes upon the pressure reaching a predetermined magnitude. In this condition the liquid would recirculate through the pump and relief valve, assuming, of course, for the moment that switch 53 in not energized by operating rod 26 depressing plunger 54. It may be convenient to remotely locate switch 53 and control plunger 54 at the will of the operator and therefore for certain applications, switch 53 may be remotely located.

Once trigger 16 is depressed, valve 17 is opened and fluid is allowed to pass through valve 17 and orifice 19. Orifice 19 is generally of smaller cross-sectional area than orifice 35 so that upon reducing the pressure in conduit 20, pressure is also reduced in branch 21 and conduit 36 thereby allowing piston 25 to return to valve seat 27 and cut off the return path through conduit 36. Thus as long as orifice 35 is larger than orifice 19, the pressure in conduit 36 will be allowed to drop sufficiently when trigger 16 is actuated so that piston 25 shuts off a flow of liquid through conduit 36. Since liquid cleaner 45 may require a certain amount of liquid to be mixed with it which may be water, valve 39 is regulated for the proper mixture of water and cleaner which would emerge from nozzle 18 of gun 15. Once the optimum setting is found for valve 39, it is generally maintained at this setting as long as the liquid cleaner remains the same and of the same consistency.

If the operator of gun 15 desires a supply of clear water for rinsing, he then would depress plunger 54 and energize coil 43 of solenoid operated valve 41. Armature 44 would be actuated and have its passage opened so that liquid could flow from source 47 through conduits 50, 48, 42 and 37 into inlet 11 of pump 10. Thus the liquid 47 could immediately follow the cleaning process without further actuation of trigger 16 since the increased pressure in conduit 37 would close check valve 38 thereby shutting off the flow of liquid cleaner 45. It is then obvious that any further manipulation of plunger 54 would again produce a cleaning solution at the nozzle 18.

It may be more convenient for some applications to have operating rod 26 engage plunger 54 to control solenoid valve 41. For this type of operation, let it also be assumed that the contacts of switch 53 are in engagement and therefore valve 41 is open and water is being drawn into pump 12. As long as trigger 16 remains deenergized and valve 17 is closed, the pressure builds up in conduit 20 in a relatively short period of time and relief valve 22 is actuated causing operating rod 26 to strike switch plunger 54, thereby deenergizing coil 43 upon the contacts of switch 53 becoming disengaged. Upon the operator depressing trigger 16, the liquid which was in the line will be discharged and will be followed immediately by a mixture of liquid 47 which may be water with the liquid cleaner 45 to produce a cleaning mixture. The cleaning mixture is then sprayed upon the area to be cleaned and when the area has been thoroughly covered with liquid cleaner, and it becomes desirable to rinse the area, trigger 16 is released and once again the pressure builds up in conduit 20 and causes piston 25 to be forced upwardly causing operating valve 26 to strike plunger 54. This operation takes place in the matter of a few seconds and therefore valve 41 is again opened and upon depressing trigger 26, water or other suitable liquid 47 is drawn into pump 10 and discharged through nozzle 18. Once trigger 16 is released, the pressure again builds up in conduit 20 and forces piston 25 upwardly thereby engaging switch plunger 54 and closing valve 41 since coil 43 is then deenergized. It will be seen that a sequential action takes place each time the trigger 16 is released and therefore a convenient control is maintained over the selection of the fluids to be placed through the gun 15 merely by releasing trigger 16 long enough for the pressure to build up in conduit 20 and cause relief valve 22 to be actuated.

It has been found that satisfactory operating results can be obtained when orifice 19 is approximately 0.0468 inch in diameter (3/64) and orifice 35 is 0.0782 inch in diameter (5/64). Orifice 19 produces a normal operating pressure of approximately 500 p.s.i. while valve 17 is open and relief valve 22 is in a deenergized position, that is, with no fluid flowing through relief valve 22. When valve 17 is closed and the pressure builds up in conduit 20, the total force against the conical shaped end of piston 25 having a diameter of 0.375 inch (3/8) must be greater than that of the spring because of the small valve seat 27 and is approximately 600 p.s.i. to overcome the spring bias of spring 31 which is generally exerting a force on piston 25 equal to approximately 200 p.s.i. It should be remembered that once piston 25 moves vertically, the fluid under pressure is exerted across the entire face of the conically shaped end of piston 25 and thereby causes piston 25 to remain vertically displaced from valve seat 27, letting the fluid under pressure flow through chamber 33 and conduit 36 at approximately 200 p.s.i. or greater. The pressure in conduit 36 is determined by orifice 35 and once valve 17 is opened, pressure in conduit 20 drops below 200 p.s.i. and piston 25 is again seated in valve 27.

From the foregoing description, it will be seen that we have provided a new and novel cleaning apparatus using a relief valve for protecting the pumping mechanism of the cleaner. It will also be seen that a simple and convenient means has been provided for alternately or sequentially changing the liquids which are dispensed through a flow directing means or gun. In one of the more convenient forms, it is seen that the remote control switching means may be operated by the relief valve which is controlled automatically merely by depressing and releasing the trigger of the flow directing means, A relief valve is made to operate by the changes in pressure of the liquids within the conduit connected to the inlet of the relief valve and the pressures are controlled through the use of orifices or other restrictions within the liquid passages so that the pressure in the conduit connected to the gun is also higher or equal to the pressure at the outlet of the relief valve.

It will, of course, be understood that various changes may be made in the form, details, arrangement and proportions of the parts without departing from the scope of our invention which consists of the matter shown and described herein and set forth in the appended claims.

We claim:

1. In a cleaning apparatus:

(a) a pump having a liquid inlet and a liquid outlet;

(b) motor means driving said pump and causing said pump to take liquid thereinto at its inlet and to discharge such liquid through its outlet;

(c) flow directing means for directing the flow of such liquid against a surface to be cleaned, said means including a valve for controlling the amount of such liquid flowing therethrough;

(d) a first conduit connected between said pump outlet and said flow directing means, said conduit having a branch line extending intermediate its ends and having a first orifice disposed in said conduit upstream from said branch line for determining the magnitude of a normal operating pressure;

(e) a pair of second and third conduits connected in parallel having a first common end connected with said pump inlet and having a second common end defining an intake adapted to be connected to a source of liquid;

(f) an adjustable restrictor valve disposed in one of said pair of conduits for restricting the flow of such liquid into said pump;

(g) a solenoid operated valve disposed in the other of said pair of conduits, said valve allowing such liquid to flow therethrough in one position and shutting off the flow in another position;

(h) a check valve allowing fluid to flow in one direction only;

(i) a fourth conduit connected with said pump inlet and said check valve, said check valve and conduit adapted to be connected to a source of liquid cleaner, said check valve allowing such liquid cleaner to be drawn from said source;

(j) a fifth conduit having a second orifice for determining a by-pass pressure lower than said operating pressure, said second orifice being larger than said first orifice;

(k) a relief valve having a liquid inlet connected to said branch line of said first conduit and having a liquid outlet connected to said pump inlet through said fifth conduit, said relief valve having an operating rod extending therefrom a maximum length when said valve is open and a minimum length when said valve is closed;

(l) a switch sequentially actuatable between an "on" and "off" condition disposed in spaced and confronting relation with said operating rod of said relief valve to be operably engaged thereby when said rod is extended to its maximum length;

(m) and electric power means connected to said motor, and connected to said solenoid in series with said switch whereby said solenoid is alternatively energized and deenergized upon said operating rod engaging said switch.

2. In a cleaning apparatus:

(a) pump means having a liquid inlet and a liquid outlet, said pump means taking liquid thereinto at its inlet and discharging such liquid through its outlet;

(b) flow directing means for directing the flow of such liquid against a surface to be cleaned, said means including a first valve for controlling the amount of such liquid flowing therethrough;

(c) a first conduit connected between said pump means outlet and said flow directing means, said conduit having a branch line extending intermediate its ends and having a first restriction disposed in said conduit upstream from said branch line for determining the magnitude of a normal operating pressure;

(d) a pair of second and third conduits having a first common end connected with said pump means inlet and having a second common end adapted to be connected to a source of liquid;

(e) a second valve disposed in one of said pair of conduits for restricting the flow of such liquid into said pump means;

(f) a control valve disposed in the other of said pair of conduits, said valve allowing such liquid to flow therethrough in one position and shutting off the flow in another position;

(g) a check valve allowing fluid to flow in one direction only;

(h) a fourth conduit connected to said pump means inlet and adapted to be connected to a source of liquid cleaner, said fourth conduit having said check valve disposed therein allowing such liquid cleaner to be drawn from said source;

(i) a fifth conduit having a second restriction for determining a by-pass pressure lower than said operating pressure, said second restriction being larger than said first restriction;

(j) a relief valve having a liquid inlet connected to said branch line of said first conduit and having a liquid outlet connected to said pump means inlet through said fifth conduit, said relief valve being energized by pressure in said first conduit exceeding said normal pressure and being deenergized by pressure in said first conduit dropping below said normal pressure;

(k) and control means connected to said relief valve and said control valve, said control means being responsive to said relief valve being energized and deenergized upon the flowing and stopping of such liquid through said first valve in said flow directing means.

3. In a cleaning apparatus:

(a) pump means having a liquid inlet and a liquid outlet, said pump means taking liquid thereinto at its inlet and discharging such liquid through its outlet;

(b) flow controlling means for controlling the flow of such liquid including a valve for controlling the amount and pressure of such liquid flowing therethrough;

(c) a first conduit connected between said pump means outlet and said flow controlling means, said conduit having a branch line extending intermediate its ends and having a first restricted passage disposed in said conduit upstream from said branch line for determining the magnitude of a normal operating pressure;

(d) a pair of second and third conduits having a first common end connected with said pump means inlet and having a second common end adapted to be connected to a source of liquid;

(e) a check valve allowing fluid to flow in one direction only;

(f) a fourth conduit connected to said pump means inlet and adapted to be connected to a source of liquid cleaner, said fourth conduit having said check valve disposed therein allowing such liquid cleaner to be drawn from said source;

(g) a restrictor valve disposed in one of said pair of conduits for restricting the flow of such liquid into said pump means;

(h) a solenoid operated valve disposed in the other of said pair of conduits, said valve allowing such liquid to flow therethrough in an open position and shutting off the flow in a closed position, said pump drawing such cleaner into said first conduit through said restrictor valve along with a restricted flow of such liquid from its source;

(i) a fifth conduit having a second restricted passage for determining a by-pass pressure lower than said operating pressure, said second restricted passage being larger than said first restricted passage;

(j) a relief valve having a liquid inlet connected to said branch line of said first conduit and having a liquid outlet connected to said pump means inlet through said fifth conduit, the pressures required to operate said relief valve being determined by said first and second restricted passages;

(k) and electrical sequential control means operably connected to said solenoid operated valve and to said relief valve, said control means being responsive to the amount and pressure of such liquid passing through said relief valve to alternately produce a mixture of such liquid cleaner or such liquid flowing through said valve in said flow controlling means upon said valve being opened and closed.

4. In a cleaning apparatus:

(a) pump means having a liquid inlet and a liquid outlet, said pump means taking liquid thereinto at its inlet and discharging such liquid through its outlet;

(b) first conduit means connected to said pump means inlet and being adapted to be connected to a first source of liquid;

(c) control valve means interposed within said first conduit means for controlling the flow of liquid from such first source of liquid;

(d) second valve means controlling the flow of fluid therethrough;

(e) second conduit means connected to said pump means inlet and adapted to be connected to a second source of liquid, said second conduit means having said second valve means disposed therein controlling the flow of such liquid to be drawn from said source;

(f) relief valve means having a liquid inlet and outlet connected to said liquid outlet and inlet respectively, of said pump means, said relief valve operating from a closed condition to an open condition upon the pressure therein reaching a first predetermined magnitude and operating from an open condition to a closed condition upon the pressure therein dropping to a second predetermined magnitude;

(g) liquid discharge means connected to said liquid outlet of said pump means having a control element therein for closing and opening a liquid passage therein causing the pressure in said relief valve means to rise to said first predetermined magnitude or fall to said second predetermined magnitude;

(h) and means remote from said control valve means for control thereof causing said pump means to draw liquid from said first source when said control valve is open and causing said pump means to draw liquid from said second source when said control valve is closed.

5. The invention as set forth in claim 4 wherein said remote means is operably connected to said relief valve means causing said control valve to be alternately opened and closed when said relief valve is operated to an open condition upon the control element of said liquid discharge means alternately closing and opening said liquid passage therein.

6. The invention as set forth in claim 4 wherein said second valve means includes a check valve allowing such liquid to flow in one direction only.

7. In a cleaning apparatus:

(a) pump means having a liquid inlet and a liquid outlet;

(b) flow directing means including a valve for controlling the amount of such liquid flowing therethrough;

(c) a first conduit connected between said pump means outlet and said flow directing means, said conduit having a branch line extending intermediate its ends and having a first reduced cross sectional area in said conduit upstream from said branch line;

(d) a pair of second and third conduits having a first common end connected with said pump means inlet and having a second common end adapted to be connected to a source of liquid;

(e) an adjustable valve disposed in one of said pair of conduits;

(f) a shut off valve disposed in the other of said pair of conduits;

(g) a check valve allowing fluid to flow in one direction only;

(h) a fourth conduit connected to said pump means inlet and adapted to be connected to a source of liquid cleaner, said fourth conduit having said check valve disposed therein;

(i) a fifth conduit having a second reduced cross sectional area disposed therein, said second reduced cross sectional area being larger than said first cross sectional area;

(j) a relief valve having a liquid inlet connected to said branch line of said first conduit and having a liquid outlet connected to said pump means inlet through said fifth conduit, said relief valve having an operating member cooperating therewith;

(k) and control means connected between said operating member of said relief valve and said shut off valve.

8. In a cleaning apparatus:

(a) pump means having a liquid inlet and a liquid outlet, said pump means taking liquid thereinto at its inlet and discharging such liquid through its outlet;

(b) a plurality of conduit means connected to said pump means inlet;

(c) a plurality of liquid sources, at least some of which contain a different liquid;

(d) control valve means interposed within at least one of said plurality of conduit means for controlling the flow of liquid from at least one of said plurality of liquid sources;

(e) second valve means for controlling the flow of liquid from all other of said plurality of liquid sources except for said sources controlled by said control valve means;

(f) relief valve means having a liquid inlet and outlet separately connected with said liquid outlet and inlet respectively of said pump means, said relief valve operating from a closed condition to an open condition upon the pressure therein reaching a first predetermined magnitude and operating from an open condition to a closed condition upon the pressure therein dropping to a second predetermined magnitude;

(g) liquid discharge means connected with said liquid outlet of said pump means having a control element for closing and opening a liquid passage therein thereby causing the pressure in said relief valve means to rise to said first predetermined magnitude or fall to said second predetermined magnitude;

(h) and sequential control means connected remotely to said control valve means for sequential control thereof causing said pump means to sequentially draw liquid from a different one of said plurality of liquid sources each time said *sequential* control [valve is opened] *means is operated.*

9. The invention as set forth in claim 8 wherein said sequential control means is operably connected to said relief valve means causing said control valve means to be alternately opened and closed when said relief valve is operated to an open condition upon the control element of said liquid discharge means alternately closing and opening said liquid passage therein.

10. The invention as set forth in claim 8 wherein said second valve means includes a check valve allowing such liquid to flow in one direction only.

*11. In a pressure washer, a power-driven pump having an inlet and an outlet connected by a flexible conduit to a spray head including a handle for directing the spray from said head, a first valve controlling flow through said head;*

*conduit means for supplying liquid to the inlet of said pump and having a first branched connected to a source of water and a second branch connected to a source of cleaning fluid;*

*a second valve controlling flow of water from said source through said first branch to said pump inlet;*

*and a third valve controlling flow of cleaning fluid through said second branch to said pump inlet, the improvements which comprise;*

*a by-pass conduit connecting the outlet of said pump to the inlet thereof;*

*an unloader valve interposed in said by-pass conduit and responsive to the pressure in said flexible conduit to open said unloader valve when the pressure in said flexible conduit exceeds a predetermined value;*

*a first electric switch;*

*electrically energizable means for actuating said second valve;*

*a first electric circuit including said switch and electrically energizable means;*

*and pressure responsive means communicating with the outlet of said pump and operatively connected to said switch whereby changes in pressure in said flexible conduit resulting from alternate opening and closing of said first valve is effective alternately to supply water and cleaning fluid to said pump when in operation.*

*12. A pressure washer in accordance with claim 11 in which said first valve is manually operable to open passage of fluid from said flexible conduit through said spray head and is biased to cut off flow through said head.*

*13. A pressure washer in accordance with claim 11 in which said third valve is a check valve disposed to allow flow from the source of cleaning fluid to the pump and is biased to prevent flow in the reverse direction through said second branch.*

*14. A pressure washer in accordance with claim 11 in which said switch has contacts for alternately opening and then closing said circuit including said electrically energizable means for actuating said second valve and said pressure responsive means is disposed to alternately open and close said switch in response to changes in pressure at the pump outlet.*

*15. A pressure washer in accordance with claim 11 in which said first switch is of the two-position toggle type having means for retaining it in one position and then the other in response to pressure changes sufficient to actuate said pressure responsive switch actuating means.*

*16. In a pressure washer, a pump having an inlet, and an outlet connected by a flexible conduit to a spray head including a handle for directing the first spray from said head, a first valve controlilng flow through said head;*

*conduit means for supplying liquid to the inlet of said pump and having a first branch connected to a source of water and a second branch connected to a source of cleaning fluid;*

*a second valve controlling flow of water from said source through said first branch;*

*a third valve controlling flow of cleaning fluid through said second branch to said pump inlet, and an electric motor operatively connected to said pump, the improvements which comprise;*

*a by-pass conduit connecting the outlet of said pump to the inlet thereof;*

*an unloader valve interposed in said by-pass conduit and responsive to the pressure in said flexible conduit to open said unloader valve when the pressure in said flexible conduit exceeds a predetermined value;*

*a first two-position electric switch having contacts for energizing a first circuit;*

*electrically energizable means for actuating said second valve to a first position;*

*a first electric circuit including contacts of said switch and said electrically energizable means for said second valve;*

*a third circuit for energizing said electric motor, a third switch included in said third circuit for controlling the operation of said motor;*

*and pressure responsive means communicating with the outlet of said pump and operatively connected to said first switch for alternately moving it from one position to the other, whereby to supply water and cleaning fluid to said pump alternately in response to the*

*opening and closing of said first valve during continuous operation of said pump.*

*17. A pressure washer in accordance with claim 16 in which said spray head includes a spray nozzle and said first valve is manually operable to open passage of liquid from said flexible conduit through said spray head to said nozzle, and is biased to cut off flow through said head.*

*18. A pressure washer in accordance with claim 16 in which said third valve is a check valve disposed to allow flow from said source of cleaning fluid to the pump and is biased to prevent flow in the reverse direction through said second branch.*

References Cited

The following reference, cited by the Examiner, are of record in the patented file of this patent or the original patent.

UNITED STATES PATENTS

| | | | |
|---|---|---|---|
| 2,578,102 | 12/1951 | Stephenson et al. | 239—124 |
| 2,698,112 | 12/1954 | Herderhorst | 239—124 |

ROBERT S. WARD, Jr., Primary Examiner

U.S. Cl. X.R.

239—305, 413, 417.5, 444, 570, 585